(12) United States Patent
Lin et al.

(10) Patent No.: US 7,826,722 B2
(45) Date of Patent: Nov. 2, 2010

(54) DRIVING APPARATUS FOR FAN MOTOR

(75) Inventors: Yu-Liang Lin, Taoyuan Hsien (TW); Tsung-Jung Hsieh, Taoyuan Hsien (TW); Yueh-Lung Huang, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 444 days.

(21) Appl. No.: 11/450,419

(22) Filed: Jun. 12, 2006

(65) Prior Publication Data

US 2007/0025707 A1 Feb. 1, 2007

(30) Foreign Application Priority Data

Jul. 29, 2005 (TW) .............................. 94125802 A

(51) Int. Cl.
*H02P 7/29* (2006.01)
(52) U.S. Cl. ................... 388/811; 388/819; 318/400.01
(58) Field of Classification Search ................. 388/811, 388/819; 318/400.01
See application file for complete search history.

(56) References Cited

U.S. PATENT DOCUMENTS

| | | | | |
|---|---|---|---|---|
| 4,855,652 A | * | 8/1989 | Yamashita et al. | 318/268 |
| 5,167,709 A | * | 12/1992 | Shinohara et al. | 106/504 |
| 5,675,231 A | * | 10/1997 | Becerra et al. | 318/801 |
| 6,407,525 B1 | * | 6/2002 | Horng et al. | 318/473 |
| 6,943,517 B2 | * | 9/2005 | Yoshitomi et al. | 318/471 |

\* cited by examiner

*Primary Examiner*—Patrick J Assouad
*Assistant Examiner*—Renata McCloud
(74) *Attorney, Agent, or Firm*—Birch, Stewart, Kolasch & Birch, LLP

(57) ABSTRACT

A driving apparatus for fan motors, electrically connected between a pulse width modulation (PWM) signal generator and a controller, includes a converter electrically connected to the PWM signal generator, generating a first reference voltage according to the duty cycle of a PWM signal generated by the PWM signal generator; a reference voltage generator electrically connected to an external power source, generating a second reference voltage according to the external power source; and a comparator having a first and second input terminal and an output terminal; wherein the first input terminal is electrically connected to the converter, the second input terminal is connected to the reference voltage generator and the output terminal is connected to the controller, and when the first reference voltage is greater than the second reference voltage, a driving signal is output from the output terminal to the controller to control the rotation speed of the fan motor.

14 Claims, 6 Drawing Sheets

DRIVING APPARATUS FOR FAN MOTOR

This Non-provisional application claims priority under U.S.C. §119(a) on Patent Application No(s). 094125802 filed in Taiwan, Republic of China on Jul. 29, 2005, the entire contents of which are hereby incorporated by reference.

BACKGROUND

The invention is related to a driving apparatus and, more particularly to a device driving fan motors.

Referring to FIG. 1, a controller 2 is utilized to drive a fan motor 1. As shown in FIG. 1, the controller 2, such as an integrated circuit (IC), has a plurality of pins for connection to some electrical devices such as a hall sensor 3, temperature sensor 4, and converter 5. The hall sensor 3 extracts a phase wave signal from the fan motor 1 and delivers the phase wave signal to the controller 2. The temperature sensor 4 can detect temperature and generate a voltage signal to the controller 2 by using a thermal resistor 41. The converter 5 converts an external pulse width modulation (PWM) signal to a voltage signal so as to input to the controller 2.

The controller 2 generates a driving signal to drive the fan motor 1 after receiving the voltage signals from the converter 5 and the temperature sensor 4. Referring to FIG. 2, a chart illustrates the relationships of the rotation speeds corresponding to various duty cycles of a PWM signal in different temperature. It is very clear to show that the lines in FIG. 2 are linear. When PWM signals with duty cycle are provided from 0% to 100% at any particular fixed temperature, the corresponding output rotation speeds follow a linear scale. In most applications, however, the rotation speed is not required to be linear to the duty cycle of the PWM signal. In fact, in applications such as large scale computers, if the rotation speeds of a system fan increase as the duty cycle of the PWM signal increases when the system is switched on or in standby mode, the resulting noise is bothersome.

SUMMARY

Accordingly, the invention provides a driving apparatus for a fan motor. A reference voltage value corresponding to a predetermined duty cycle of the PWM signal can be decided to the driving apparatus by the system, such that a controller drives the fan motor to operate at a fixed low speed when duty cycle of the PWM signal is lower than that predetermined, and at variable speeds according to the PWM signal when duty cycle of the PWM signal is higher than that predetermined. Therefore, the fan motor operates at a constant low speed when the system is switched on or in standby mode, whereby reducing the fan noise.

A driving apparatus for a fan motor is electrically connected between a pulse width modulation (PWM) signal generator and a controller and includes a converter, a reference voltage generator, and a comparator. The converter is electrically connected to the PWM signal generator and outputs a first reference voltage according to the duty cycle of a PWM signal generated by the PWM signal generator. The reference voltage generator is electrically connected to an external power source and generates a second reference voltage according to the external power source. The comparator has a first and second input terminal and an output terminal.

The first input terminal is electrically connected to the converter, the second input terminal is electrically connected to the reference voltage generator and the output terminal is electrically connected to the controller. When the first reference voltage is greater than the second reference voltage, a driving signal is output from the output terminal to the controller so as to control the rotation speed of the fan motor.

DESCRIPTION OF THE DRAWINGS

The accompanying drawings, incorporated in and constitute a part of this specification, illustrate embodiments of the invention and, together with the description, serve to explain the features, advantages, and principles of the invention.

DETAILED DESCRIPTION

Figure 1:
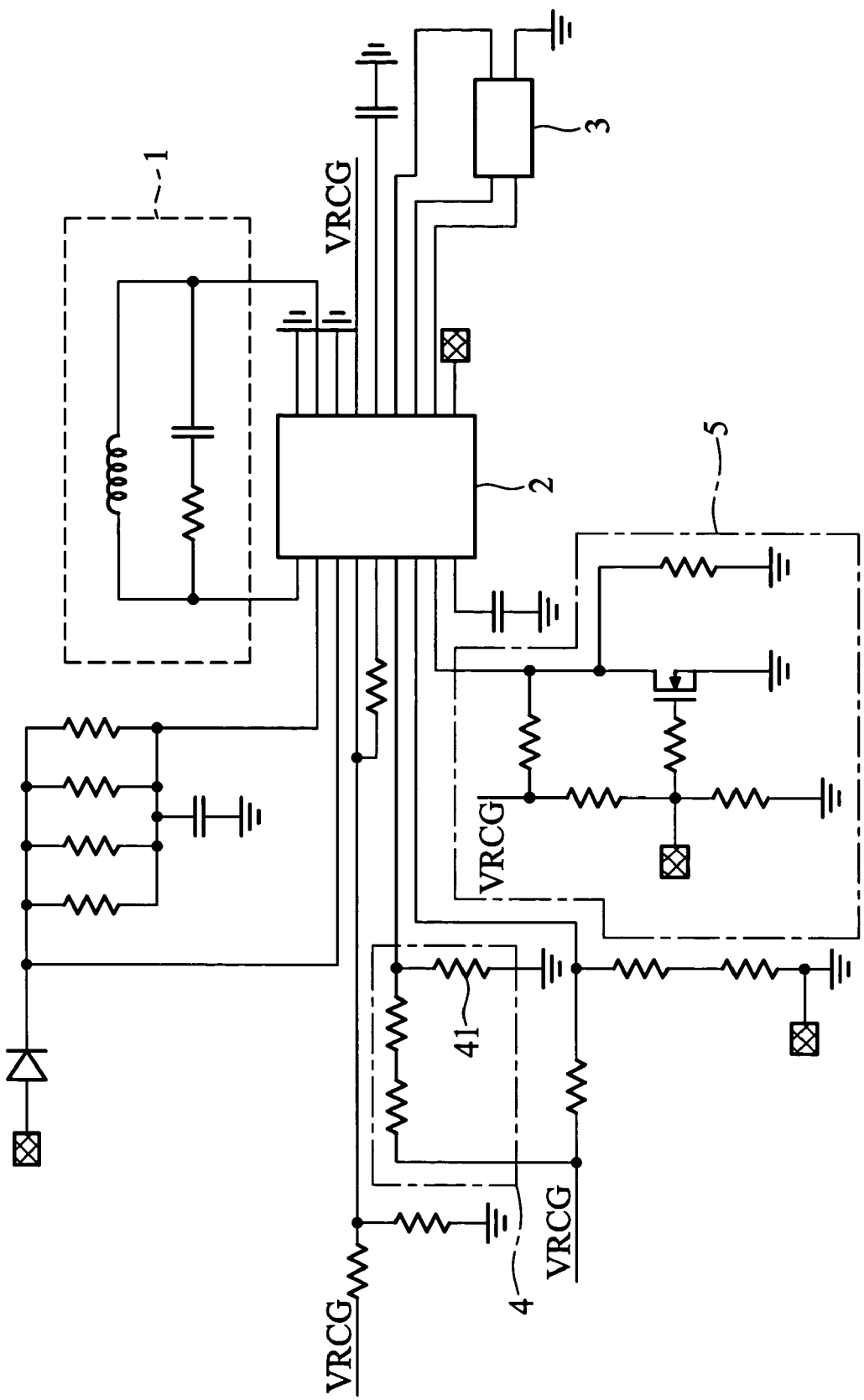
FIG. 1 shows a conventional fan motor circuit.
Figure 2:
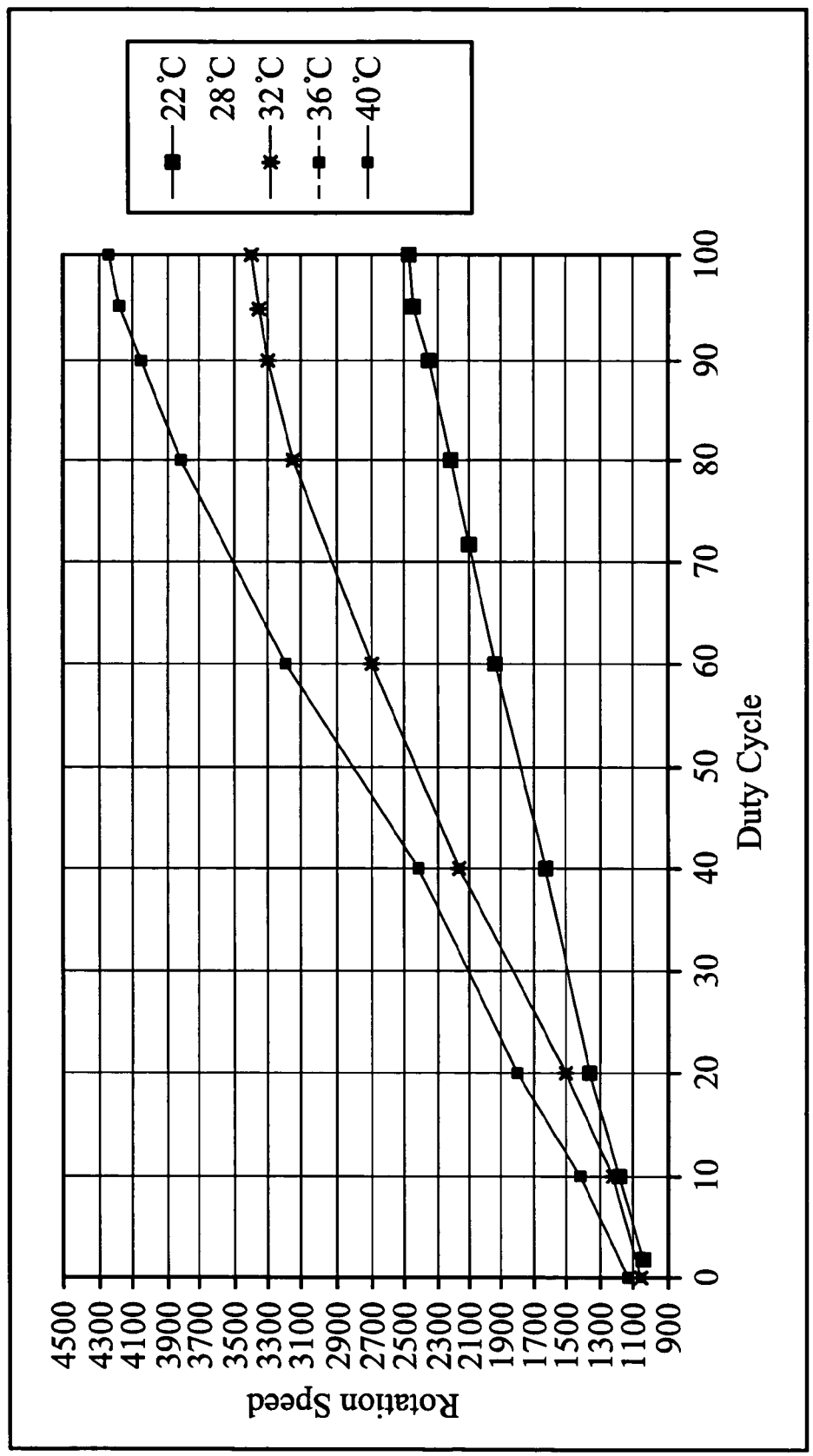
FIG. 2 is a chart illustrating characteristic curves of the fan motor circuit in FIG. 1.
Figure 3:
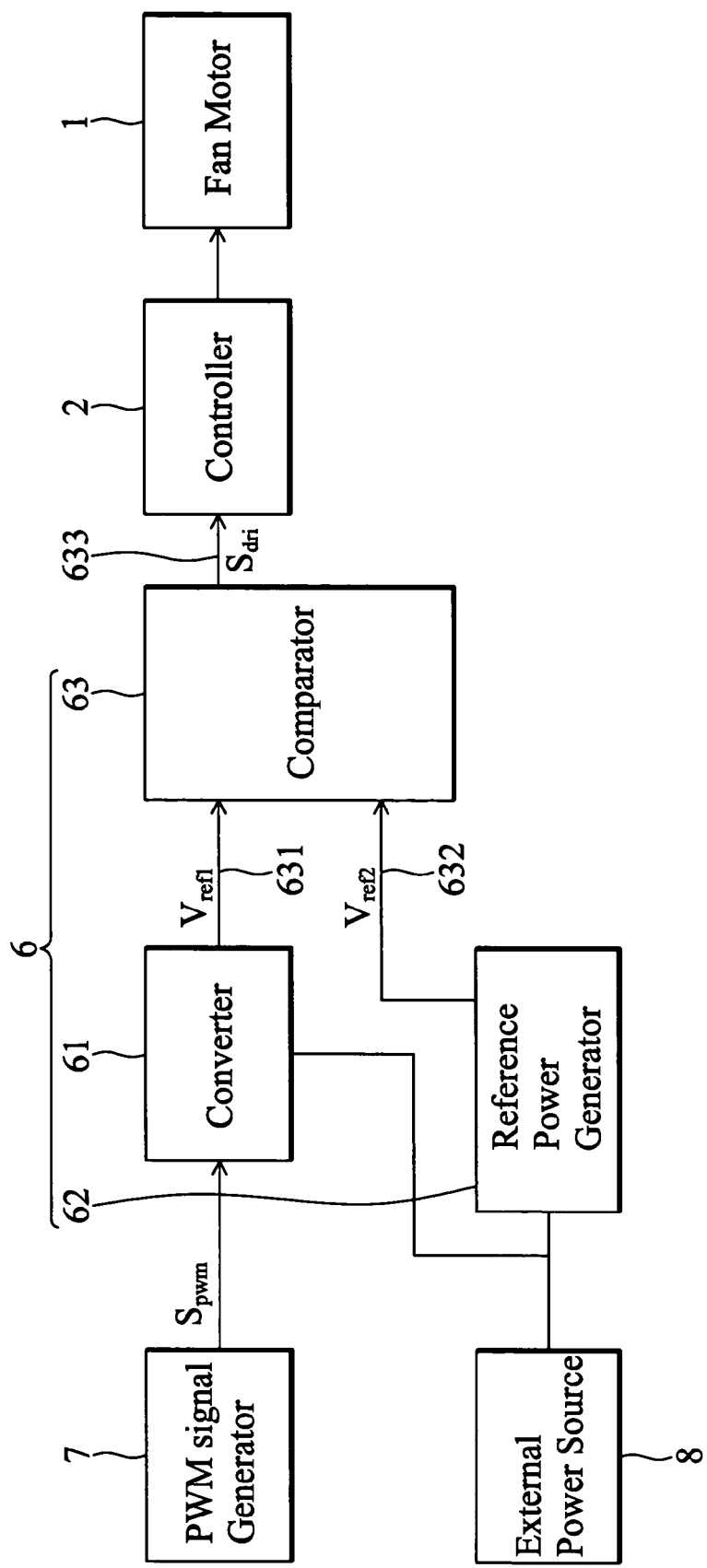
FIG. 3 is a block diagram of a fan motor circuit according to a preferred embodiment of the invention.

Referring to FIG. 3, it is a block diagram of a fan motor circuit according to a preferred embodiment of the invention. In FIG. 3, a driving apparatus 6 is electrically connected between a pulse width modulation (PWM) signal generator 7 and a controller 2. The driving apparatus 6 mainly includes a converter 61, a reference voltage generator 62 and a comparator 63.

The converter 61 is electrically connected to the PWM signal generator 7 and outputs a first reference voltage $V_{ref1}$ according to the duty cycle (from 0% to 100%) of a PWM signal $S_{pwm}$ generated by the PWM signal generator 7.

The reference voltage generator 62 is electrically connected to an external power source 8, and generates a second reference voltage $V_{ref2}$ according to the power source 8.

The comparator 63 has a first input terminal 631 electrically connected to converter 61, a second input terminal 632 electrically connected to reference voltage generator 62, and an output terminal 633 electrically connected to controller 2.

When the first reference voltage $V_{ref1}$ is lower than the second reference voltage $V_{ref2}$, there is no any signal outputted from the output terminal of comparator 63, and the controller 2 controls the fan motor 1 to operate at a fixed low speed according to a predetermined low speed setting. When the first reference voltage $V_{ref1}$ is greater than the second reference voltage $V_{ref2}$, a driving signal $S_{dri}$ is outputted from the output terminal 633 of the comparator 63 to the controller 2, such that the controller 2 can control and change the rotation speed of the fan motor 1 according to the modulations of the driving signal $S_{dri}$.

Figure 4:
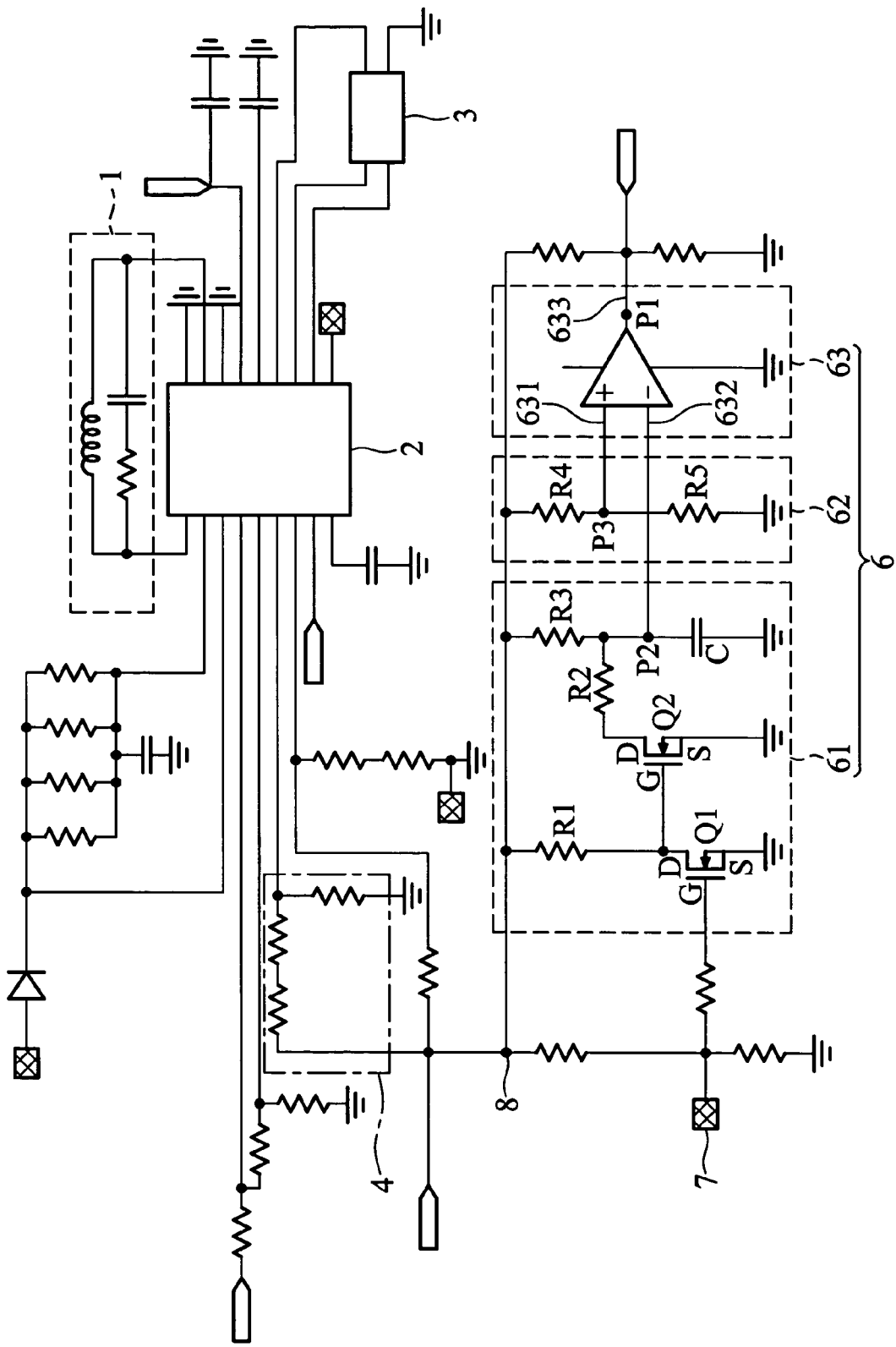
FIG. 4 shows a schematic circuit according to a preferred embodiment of the invention.

Referring to FIG. 4, it shows a schematic circuit according to a preferred embodiment of the invention. The controller 2 is preferably an integrated circuit (IC), and the controller 2 has several pins for allowing electrical devices such as the hall sensor 3, the temperature sensor 4, or the driving apparatus 6 to connect. The function and operation of the hall sensor 3 and the temperature sensor 4 are as discussed above.

In this embodiment, the converter 61 of the driving apparatus 6 is preferably a charging and discharging circuit. The charging and discharging circuit mainly includes a first resister R1, a second resister R2, a third resister R3, a capacitor C, a first switching device Q1 and a second switching device Q2. The first switching device Q1 and the second switching device Q2 are preferably transistors, and more particularly, or a metal-oxide-semiconductor (MOS) device/

MOSFET. The gate G of the first switching device Q1 is electrically connected to the PWM signal generator 7, and the gate G of the second switching device Q2 is electrically connected to the drain D of the first switching device Q1. The sources S of the first and second switching devices Q1 and Q2 are both connected to a ground terminal. The first terminal of the first resistor R1 is electrically connected to the PWM signal generator 7 and an external power source 8. The second terminal of the first resistor R1 is electrically connected to the drain D of the first switching devices Q1. The first terminal of the second resister R2 is electrically connected to the drain D of the second switching devices Q2, and the second terminal of the second resister R2 is electrically connected to the second terminal of the third resister R3. The first terminal of the third resister R3 is electrically connected to the first terminal of the first resister R1. The first terminal of the capacitor C is electrically connected to the second terminal of the third resister R3, and the second terminal of the capacitor C is electrically connected to the ground terminal.

Further, the reference voltage generator of the driving apparatus 6 is preferably a voltage divider, and mainly includes a fourth resistor R4 and a fifth resistor R5. The first terminal of the fourth resister R4 is electrically connected to the first terminal of the third resister R3 so as to acquire electricity from the external power source 8. The second terminal of the fourth resister R4 is electrically connected to the first terminal of the fifth resister R5, and the second terminal of the resister R5 is electrically connected to the ground terminal.

The comparator 63 has a positive terminal "+" (i.e. the second terminal 632), a negative terminal "−" (i.e. the first terminal 631) and an output terminal 633. The positive terminal "+" is electrically connected to a third reference node P3 between the fourth resister R4 and the fifth resister R5. The negative terminal "−" is electrically connected to a second reference node P2 between the third resister R3 and the capacitor C3. The output terminal 633 of the comparator 63 is defined as the third reference node P3 and is electrically connected to the controller 2.

Figure 5:
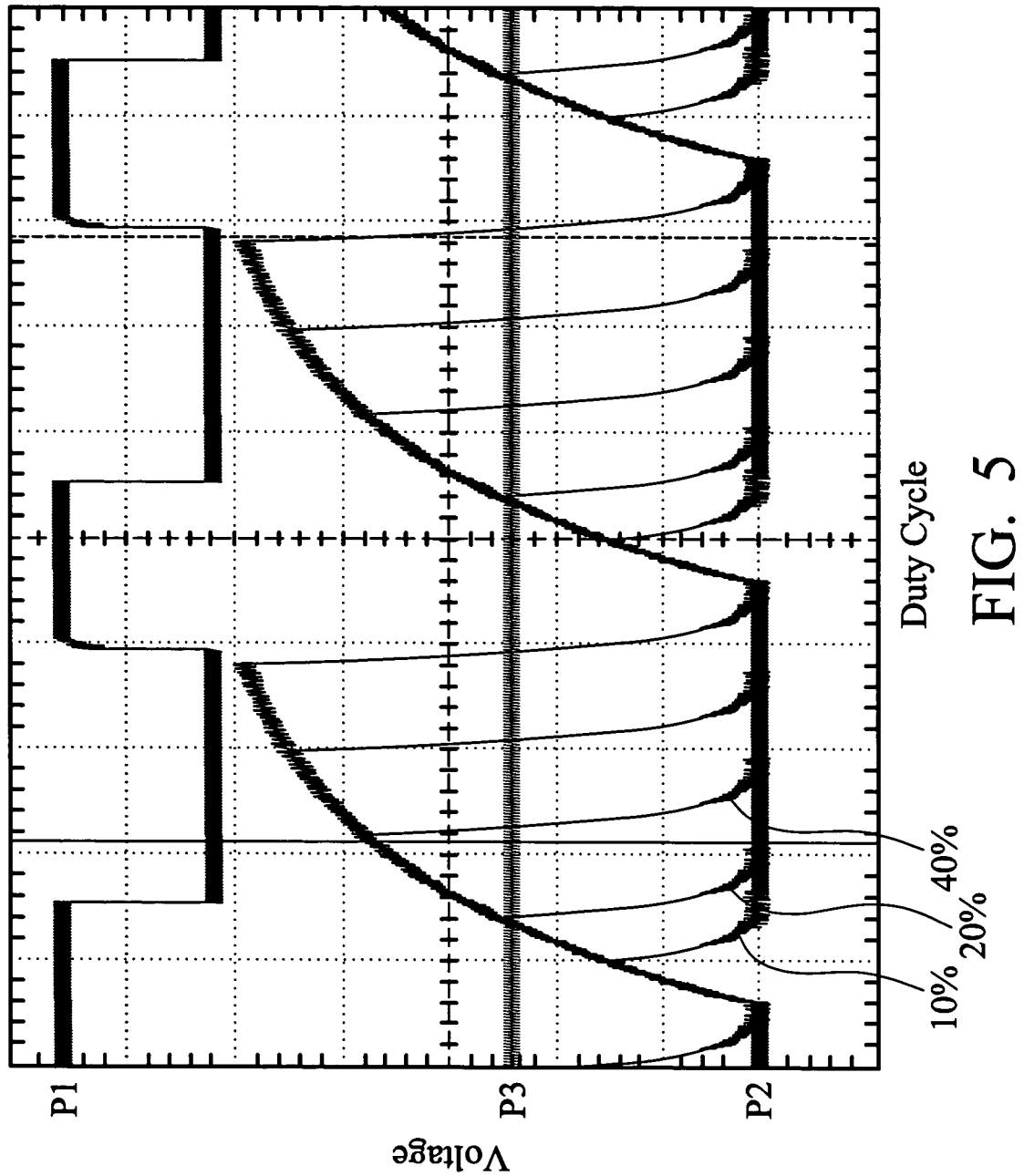
FIG. 5 illustrates waveforms of voltages in reference nodes of FIG. 4.
Figure 6:
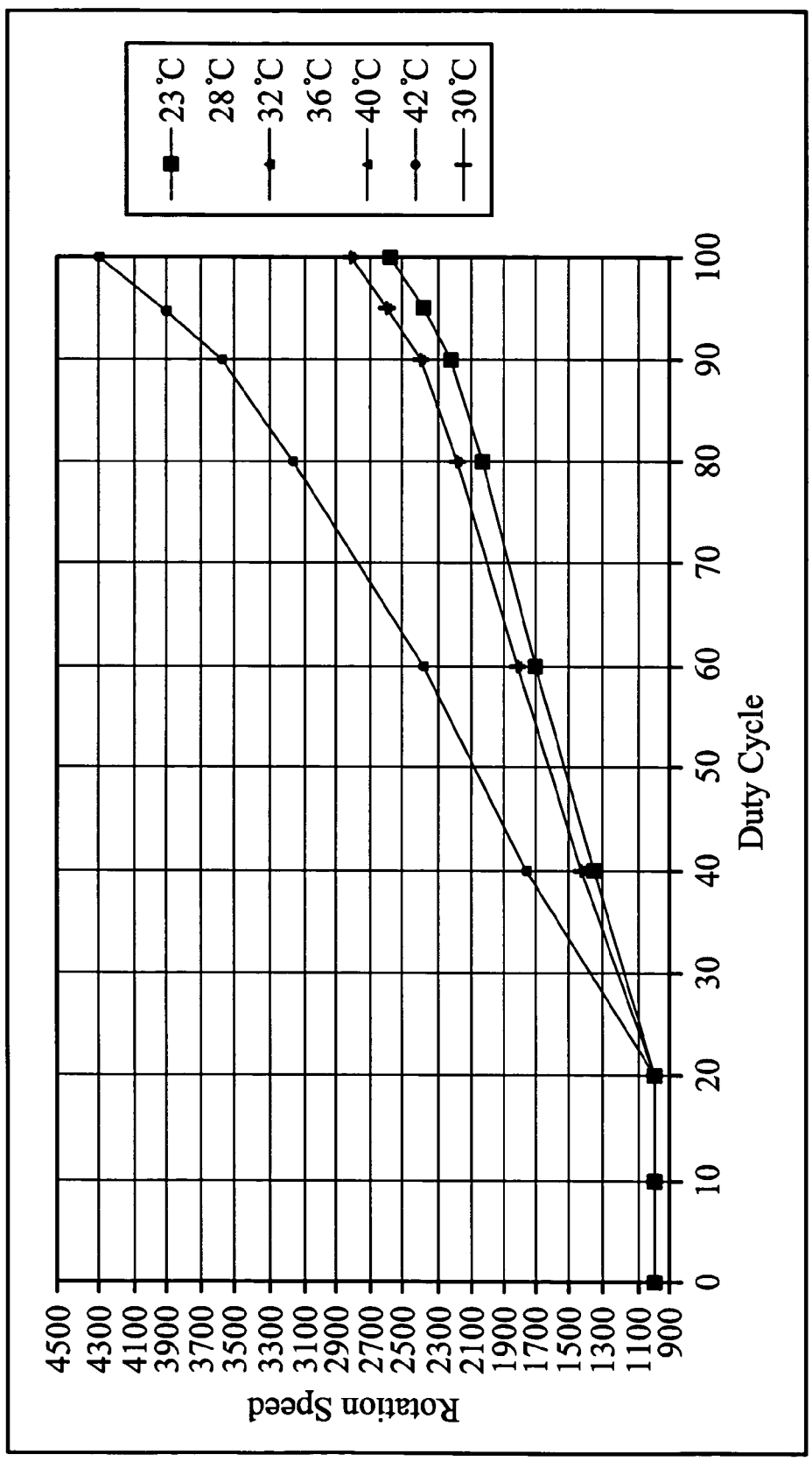
FIG. 6 is a chart illustrating-characteristic curves corresponding to the waveforms of FIG. 5.

With reference to FIGS. 5 and 6, an example of the operation of the circuit of FIG. 4 is described as below.

In an embodiment according to the invention, the PWM signal generator 7 outputs a PWM signal $S_{PWM}$ to the converter 61, such that the capacitor C is charged according to the characteristics of the first switching device Q1 and the second switching device Q2. When the voltage of the capacitor C1 (i.e. the first reference voltage $V_{ref1}$) is greater than the second reference voltage $V_{ref2}$ which is divided from the reference voltage generator 62 (i.e. the voltage of the negative terminal "−" is higher than that of the positive terminal "+" of the comparator 63), the comparator 63 outputs a driving signal $S_{dri}$ to the fan motor 1 from the output terminal 633 such that the fan motor 1 operates at a rotation speed according to the value of driving signal $S_{dri}$.

FIG. 5 illustrates the waveforms of voltages in the first, second and third reference nodes P1, P2 and P3 of FIG. 4, respectively. Also, with reference to FIG. 6, when the duty cycle of PWM signal $S_{pwm}$ is between 0% and 20%, the output of the comparator 63 is at a "high" level, such that the controller 2 outputs a static driving signal to the fan motor 1 and the fan motor 1 operates at a fixed low speed (also called basic speed) according to a predetermined low speed setting. When the duty cycle of PWM signal $S_{pwm}$ is greater than 20%, the output of comparator 63 is at a "low" level, such that the controller 2 outputs the driving signal according to is the duty cycle of PWM signal $S_{pwm}$, whereby controlling the rotation speed of the fan motor 1 to have variable speeds to the fan motor 1.

Please note that the controller 2 delivers a static driving signal when receiving a low level signal, and the controller 2 delivers a variable driving signal according to the duty cycle of PWM signal when receiving a high level signal. On the other hand, when a controller acts contrary to the input signal, the operation of the circuit mentioned can be modified accordingly to achieve the same function.

Also note that the converter 62 can also be an analog-to-digital converter and generates a digital value of the first reference voltage $V_{ref1}$ according to PWM signal $S_{pwm}$. The second reference voltage $V_{ref2}$ can also be generated by an oscillating circuit internally built in the controller 2.

By implementation of the driving apparatus 6 provided, a voltage value corresponding to a predetermined duty cycle of the PWM signal can be decided by the system, such that the fan motor operates at a fixed low speed when the duty cycle of the PWM signal is lower than that predetermined. Therefore, the fan motor operates in low speed when the system is switched on or in standby mode, whereby reducing noise and power consumption.

While the invention has been described by way of example and in terms of preferred embodiment, it is to be understood that the invention is not limited thereto. Those skilled in the technology can still make various alterations and modifications without departing from the scope and spirit of this invention. Therefore, the scope of the present invention shall be defined and protected by the following claims and their equivalents.

What is claimed is:

1. A driving apparatus for a fan motor, electrically connected between a pulse width modulation (PWM) signal generator and a controller, comprising:

a converter electrically connected to the PWM signal generator and outputting a first reference voltage according to a duty cycle of a PWM signal generated by the PWM signal generator, wherein the converter is a charging and discharging circuit comprising a first and second switching device, a third resistor and a capacitor, each of the first and second switching devices being a metal-oxide-semiconductor (MOS) device, and wherein the first switching device has a gate electrically connected to the PWM signal generator, a drain directly electrically connected to a gate of the second switching device, and a source electrically connected to a ground terminal;

a reference voltage generator electrically connected to an external power source, and generating a second reference voltage according to the external power source; and a comparator having a first and second input terminal and an output terminal;

wherein the first input terminal is electrically connected to the converter and receives the first reference voltage, the second input terminal is electrically connected to the reference voltage generator and receives the second reference voltage, and the output terminal is electrically connected to the controller; when the first reference voltage is greater than the second reference voltage, a driving signal is output from the output terminal to the controller so as to control a rotation speed of the fan motor, and when the first reference voltage is not greater than the second reference voltage, the controller drives the fan motor at a fixed low speed according to a predetermined low speed setting.

2. The driving apparatus as claimed in claim 1, wherein the controller is an integrated circuit (IC).

3. The driving apparatus as claimed in claim 1, wherein the controller is further electrically connected to a hall sensor acquiring a phase wave signal from the fan motor, and outputting the phase wave signal to the controller.

4. The driving apparatus as claimed in claim 1, wherein the controller is further electrically connected to a temperature sensor outputting a voltage signal to the controller after detecting a temperature.

5. The driving apparatus as claimed in claim 1, wherein the second switching device has a drain electrically connected between the third resistor and the capacitor, and a source electrically connected to the ground terminal.

6. The driving apparatus as claimed in claim 5, wherein the second input terminal of the comparator is electrically connected between the third resistor and the capacitor.

7. The driving apparatus as claimed in claim 1, wherein the comparator further comprises a first resistor having a first terminal electrically connected between the PWM signal generator and the external power source, and a second terminal electrically connected to the drain of the first switching device.

8. The driving apparatus as claimed in claim 5, wherein the comparator further comprises a second resistor having a first terminal electrically connected to the drain of the first switching device, and a second terminal electrically connected between the third resistor and the capacitor.

9. The driving apparatus as claimed in claim 1, wherein the reference voltage generator is a voltage divider.

10. The driving apparatus as claimed in claim 9, wherein the reference voltage generator comprises a fourth and fifth resistor.

11. The driving apparatus as claimed in claim 10, wherein the fourth resistor has a first terminal electrically connected to the external power source and a second terminal electrically connected between a first terminal of the fifth resistor and the second terminal of the comparator, and a second terminal of the fifth resistor is electrically connected to a ground terminal.

12. The driving apparatus as claimed in claim 1, wherein the first input terminal is the negative terminal of the comparator.

13. The driving apparatus as claimed in claim 1, wherein the second input terminal is the positive terminal of the comparator.

14. The driving apparatus as claimed in claim 1, wherein the second reference voltage is generated by an oscillating circuit of the controller.

* * * * *